2,959,202
LATHE CHUCKS

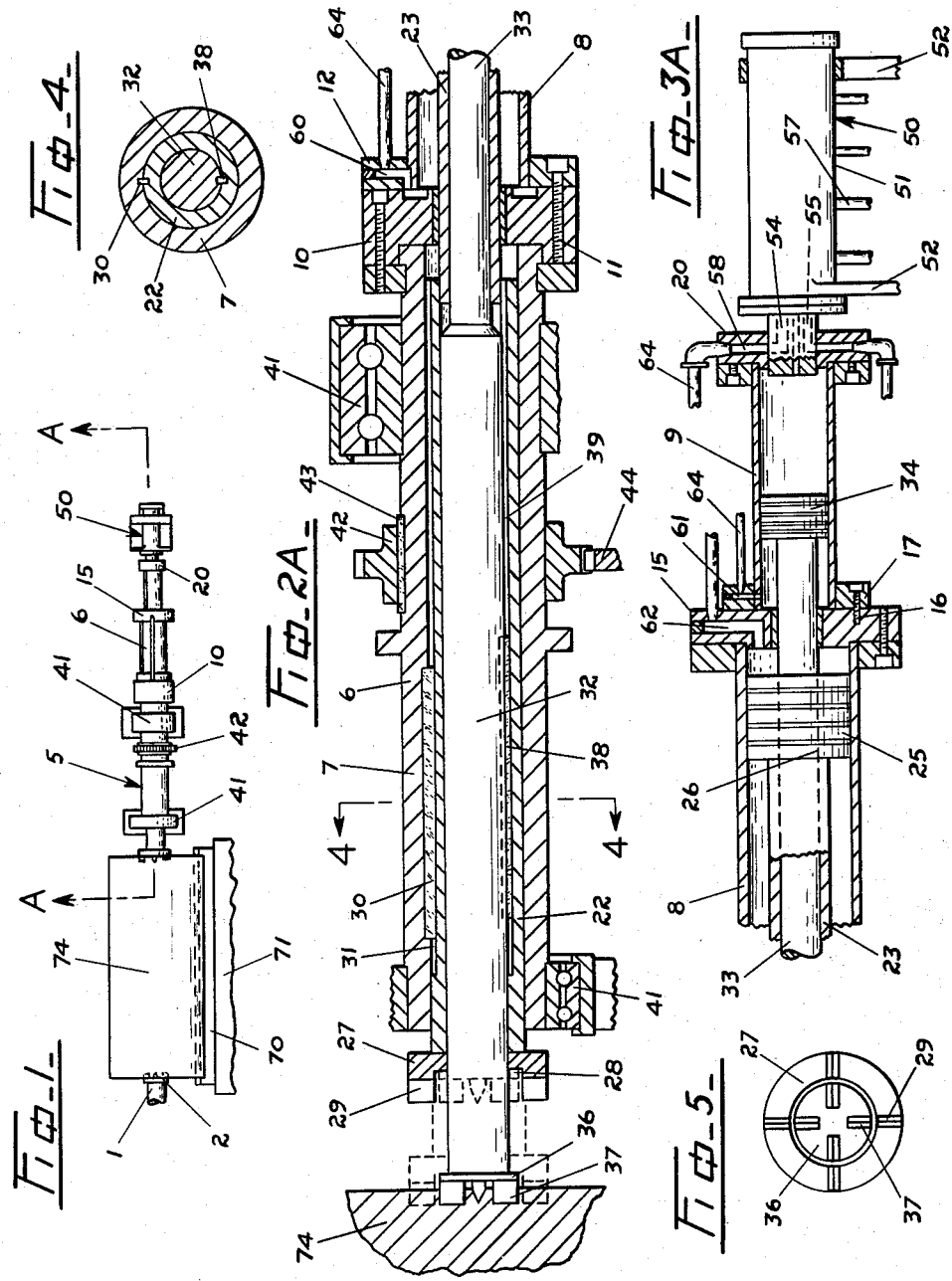

Norman Clayton Springate, Port Moody, British Columbia, Canada, assignor to Canadian Forest Products Ltd., Vancouver, British Columbia, Canada Filed Nov. 18, 1958, Ser. No. 774,764

1 Claim. (Cl. 144—209)

This invention particularly relates to a chuck for a lathe used to support and rotate a log being peeled into veneer sheets.

A machine of this nature employs a pair of horizontally aligned centers which grip the ends of the log and rotate it against the peeling knife. The logs from which the rotary cut veneer is peeled are often of considerable size and in order to provide adequate driving contact with a large diameter log it is necessary to provide the chuck with a correspondingly large log gripping member. The peeling knife used is obviously longer than the log and when a large chuck member is used a point is reached during the peeling operation when the advancing knife is getting dangerously close to the perimeter of said member. In such a case it has hitherto been necessary to stop the lathe and replace the large chuck member with a smaller one so that the reduced log could be peeled down to its minimum diameter.

The principal object of the present invention is to provide means whereby logs of various diameter may be properly supported and peeled in one continuous operation.

Other objects will appear in the following specification in which:

Figure 1 is a reduced scale view of portion of a veneer lathe.

Figures 2A and 3A are longitudinal sections of the lathe chuck taken on the line A—A of Figure 1.

Figure 4 is a transverse section taken on the line 4—4 of Figure 2A.

Figure 5 is an elevation of the log gripping end face of the chuck.

In the drawings like characters of reference indicate corresponding parts in each figure.

As shown in Figure 1, the veener lathe has a center 1 which is preferably fixed against axial movement and is fitted with a plate 2 having horizontally projecting dogs 3. Horizontally aligned with the center 1 is a chuck generally indicated by the numeral 5 and consisting of a cylindrical casing 6 which is made up of a sleeve 7, a first cylinder 8 and a second cylinder 9. The sleeve is fitted with a block 10 which is secured by bolts 11 to a flange 12 on the first cylinder. A head 15 is fitted to the cylinder 8 and is bolted as at 16 to a flange 17 on the second cylinder 9 and said second cylinder is provided with a head 20.

Slidably mounted in the sleeve 7 is a tubular outer spindle 22 having a reduced extension 23 which projects through the block 10 into the cylinder 8. The first cylinder 8 is fitted with a piston 25 having a bore 26 and said piston is secured to the end of the extension 23. An annular chuck plate 27 having a central recess 28 and projecting dogs 29 surrounding said recess is secured to the free end of the outer spindle and said spindle is non-rotatably secured to the sleeve 7 by a spline or key 30 which rides in a key way 31.

The spindle 22 encloses an endwise movable inner spindle 32 which has a reduced portion 33 projecting through the extension 23, the bore 26 of the piston 25 and the head 15. Within the second cylinder 9 the portion 33 is fitted with a piston 34 and the opposite end of the inner spindle is provided with a circular chuck plate 36 having spaced dogs 37. The diameter of the plate 36 is such that it may be seated in the recess 28 so that the dogs 29 and 37 may be disposed in a single vertical plane, see particularly Figure 2A. The inner spindle has a spline or key 38 which is partly housed in a keyway 39 formed in the outer spindle.

The casing 6 is journalled in horizontally aligned bearings 41 suitably spaced along its length. A ring gear 42 is secured to the sleeve 7 by a key 43 and is engaged by the pinion 44 of a suitable drive motor, not shown.

The pistons 25 and 34 are adapted to be operated by hydraulic means which preferably would be controlled by an oil distributor 50 having a body 51 aligned with the casing 6 and fixedly mounted upon standards 52. A cylindrical plug 54 is rotatably mounted in the body 51 and is secured within the head 20 of the second cylinder 9. The plug 54 has various passages 55 which communicate with pipes 57 extending into the distributor body and also with ports 58 formed in the head 20. Ports 60 and 61 are provided in the flanges 12 and 17, respectively, and the head 15 has a port 62. The several ports and the distributor 50 are connected by pipes 64 and a suitable control valve, not shown, is provided which enables the lathe operator to selectively feed oil to either side of the pistons 25 and 34.

In Figure 1 the veneer lathe is shown as being equipped with a knife 70 which is mounted in a carriage 71 for movement towards and away from the longitudinal axis of the chuck 5.

In operation, the log 74 to be cut into veneer sheets is first centered in the lathe and assuming the log is of relatively large diameter the cylinders 8 and 9 are both pressurized so as to simultaneously move their respective pistons away from the distributor end of the casing 6. The plates 27 and 36 move as a unit into contact with the log so that it is gripped between said plates and the center 1. Sufficient hydraulic pressure is exerted to embed the dogs of the center and the chuck plates in the end of the log and provide proper driving engagement for the chuck. With the log rotating at a suitable speed the knife 70 is slowly advanced at a constant speed to cut a veneer sheet from the log. As the knife approaches the periphery of the outer chuck plate the cylinder 8 is pressurized to withdraw said chuck plate from the end of the log or to the solid line position of Figure 2A. This allows the cut to continue without interruption until the knife approaches the periphery of the inner chuck plate 36 which is substantially the same diameter as the plate 2 of the center 1. The log then has been reduced to its minimum diameter and is removed from the lathe.

In a case where the log is of relatively small diameter and may be adequately supported by the center 1 and the inner chuck plate 36, the outer plate 27 is retained in the withdrawn position as the veneer cutting operation is carried out.

The driving force of the lathe motor is applied to the casing rather than to a single spindle as is the case with the conventional veneer lathe. Maximum torque is thus applied through the casing to both the inner and outer spindles and this ensures that no undue strain is imposed upon the several lathe parts particularly when a large diameter log is engaged by both the chuck plates and is rotated thereby as it is peeled into veneer sheets.

What I claim as my invention is:

In a lathe for producing rotary cut veneer from logs, a chuck having a rotatably supported casing, said casing having a sleeve, a first cylinder secured to the sleeve and a second cylinder secured to the first cylinder, said sleeve having a drive gear for rotating the casing, an outer spindle mounted in the casing, means for slidably and non-rotatably securing the outer spindle to the casing, a piston in the first cylinder secured to one end of the outer spindle, a chuck plate secured to the opposite end of the outer spindle, said outer spindle chuck plate having a recess and log engaging dogs bordering said recess, an inner spindle mounted in the outer spindle and extending therethrough means for slidably and non rotatably securing the inner spindle to the outer spindle, a piston in the second cylinder secured to one end of the inner spindle, a chuck plate secured to the opposite end of the inner spindle, said inner spindle chuck plate having log engaging dogs and being adapted to seat in the recess of the outer spindle chuck plate, said first and second cylinders having ported members at each end, a fluid distributor supported at one end of the casing in axial alignment therewith, said fluid distributor having pipes connected to a source of fluid pressure, a plug rotatably mounted in the fluid distributor, said plug secured to the ported member of the second cylinder and having passages, said passages communicating with the first and second cylinders and with the pipes of the fluid distributor.

References Cited in the file of this patent
UNITED STATES PATENTS

| | | |
|---|---|---|
| Re. 24,713 | Latimer | Oct. 6, 1959 |
| 2,338,125 | May | Jan. 4, 1944 |
| 2,714,370 | Jeschke | Aug. 2, 1955 |
| 2,869,596 | Latimer | Jan. 20, 1959 |